(12) United States Patent
Burcham

(10) Patent No.: US 7,980,915 B2
(45) Date of Patent: Jul. 19, 2011

(54) VARIABLE PITCH GAME CALL

(75) Inventor: Gregory Scott Burcham, Hartselle, AL (US)

(73) Assignee: EBSCO Industries, Inc, Birmingham, AL (US)

(*) Notice: Subject to any disclaimer, the term of this patent is extended or adjusted under 35 U.S.C. 154(b) by 47 days.

(21) Appl. No.: 12/429,672

(22) Filed: Apr. 24, 2009

(65) Prior Publication Data

US 2010/0273393 A1    Oct. 28, 2010

(51) Int. Cl.
*A63H 5/00* (2006.01)
(52) U.S. Cl. ............. 446/397; 446/421; 43/1; 43/2
(58) Field of Classification Search ............ 446/421, 446/397, 418, 422, 402, 403, 420, 236, 265, 446/266, 354, 358, 484, 433, 242, 489, 73, 446/72, 390, 331, 330, 268; D10/116, 119; 43/1; 84/410, 404; 221/24, 178, 176, 29, 221/28
See application file for complete search history.

(56) References Cited

U.S. PATENT DOCUMENTS

| | | | | |
|---|---|---|---|---|
| 1,363,325 A * | 12/1920 | Kohn | ............. | 446/420 |
| 1,385,054 A * | 7/1921 | Sommers | ............. | 446/420 |
| 2,606,401 A * | 8/1952 | Boatwright | ............. | 446/397 |
| 4,343,108 A * | 8/1982 | Lee | ............. | 446/397 |
| 4,422,262 A | 12/1983 | Moss | | |
| 4,941,858 A | 7/1990 | Adams | | |
| 5,207,769 A * | 5/1993 | Malta | ............. | 84/404 |
| 5,846,119 A | 12/1998 | Long | | |
| 6,149,492 A | 11/2000 | Davis, Jr. | | |
| 6,168,493 B1 | 1/2001 | Kirby | | |
| 2005/0282463 A1* | 12/2005 | Collier | ............. | 446/202 |

* cited by examiner

*Primary Examiner* — Gene Kim
*Assistant Examiner* — Matthew B Stanczak
(74) *Attorney, Agent, or Firm* — Smith, Gambrell & Russell

(57) ABSTRACT

An apparatus for use as a game call contemplate a plurality of rotor mounted acoustical plates having differing tonal qualities which can be selectively positioned for engagement by a complimentary striking plate to produce individually distinct sounds or tones.

8 Claims, 8 Drawing Sheets

VARIABLE PITCH GAME CALL

BACKGROUND OF THE INVENTION

The present invention relates to the field of hunting and more specifically to apparatus used by hunters and other wildlife enthusiasts to call wild game into their vicinity. More particularly, the present invention relates to the field of box calls generally. In even greater particularity the present invention is a call having a striker and a an plurality of selectable sounding plates.

SUMMARY OF THE PRESENT INVENTION

It is an object of the present invention to enable the hunter to quickly and easily tune his call to the sound of the hens or gobblers in his hunting area.

Another object of the invention is to enable the hunter to sound like several different birds while only using one call.

Still another object of the invention is to provide a variable pitch call that is simple to use and saves the hunter the necessity of carrying several different calls.

These and other objects and advantages of the invention will become apparent from the following detailed description of the preferred embodiment of the invention.

BRIEF DESCRIPTION OF THE DRAWINGS

An apparatus for calling turkeys is depicted in the accompanying drawings which form a portion of this disclosure and wherein.

DESCRIPTION OF THE PREFERRED EMBODIMENT

Figure 1:
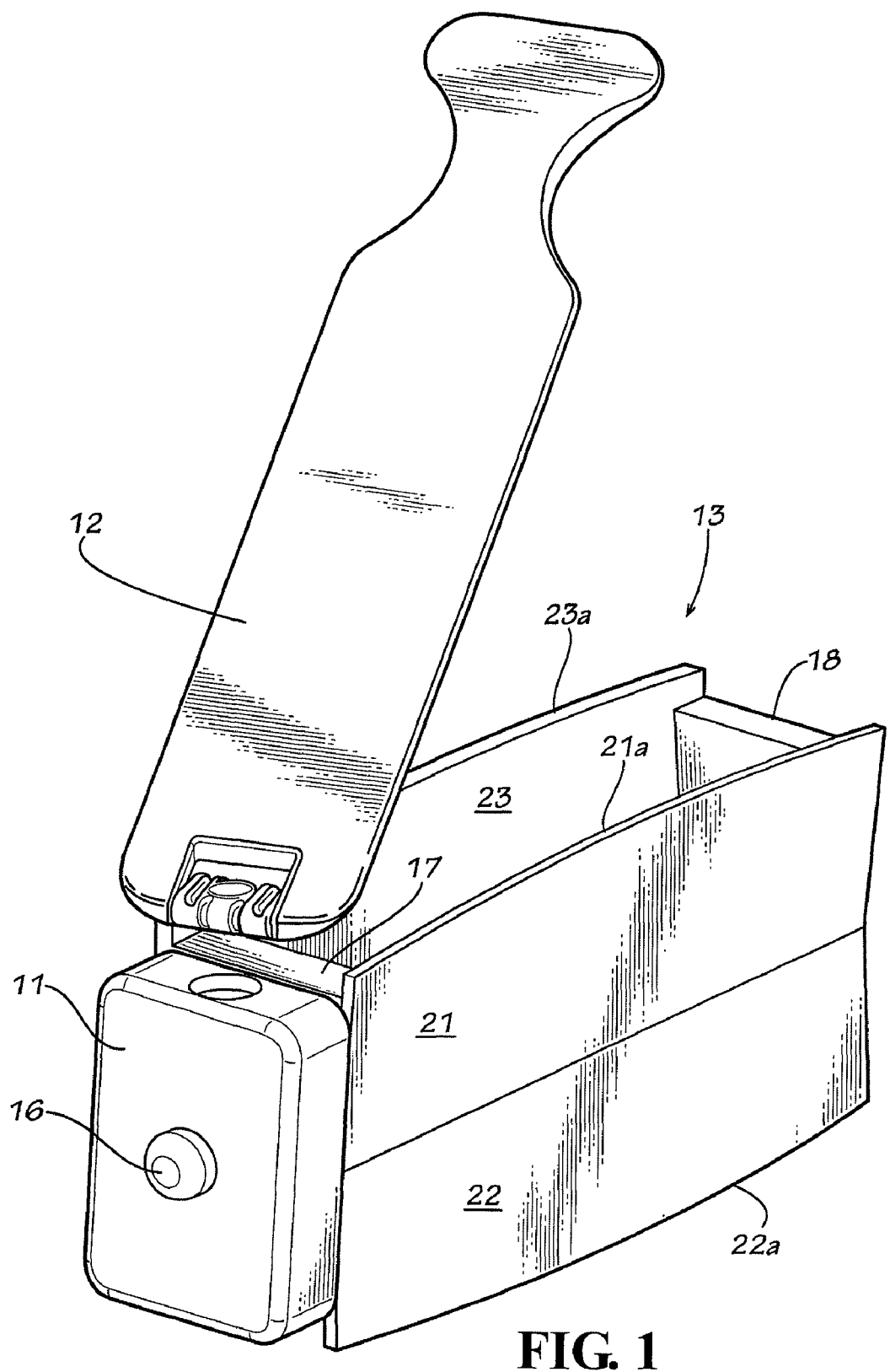
FIG. 1 is a perspective view of a first embodiment of the apparatus.
Figure 2:
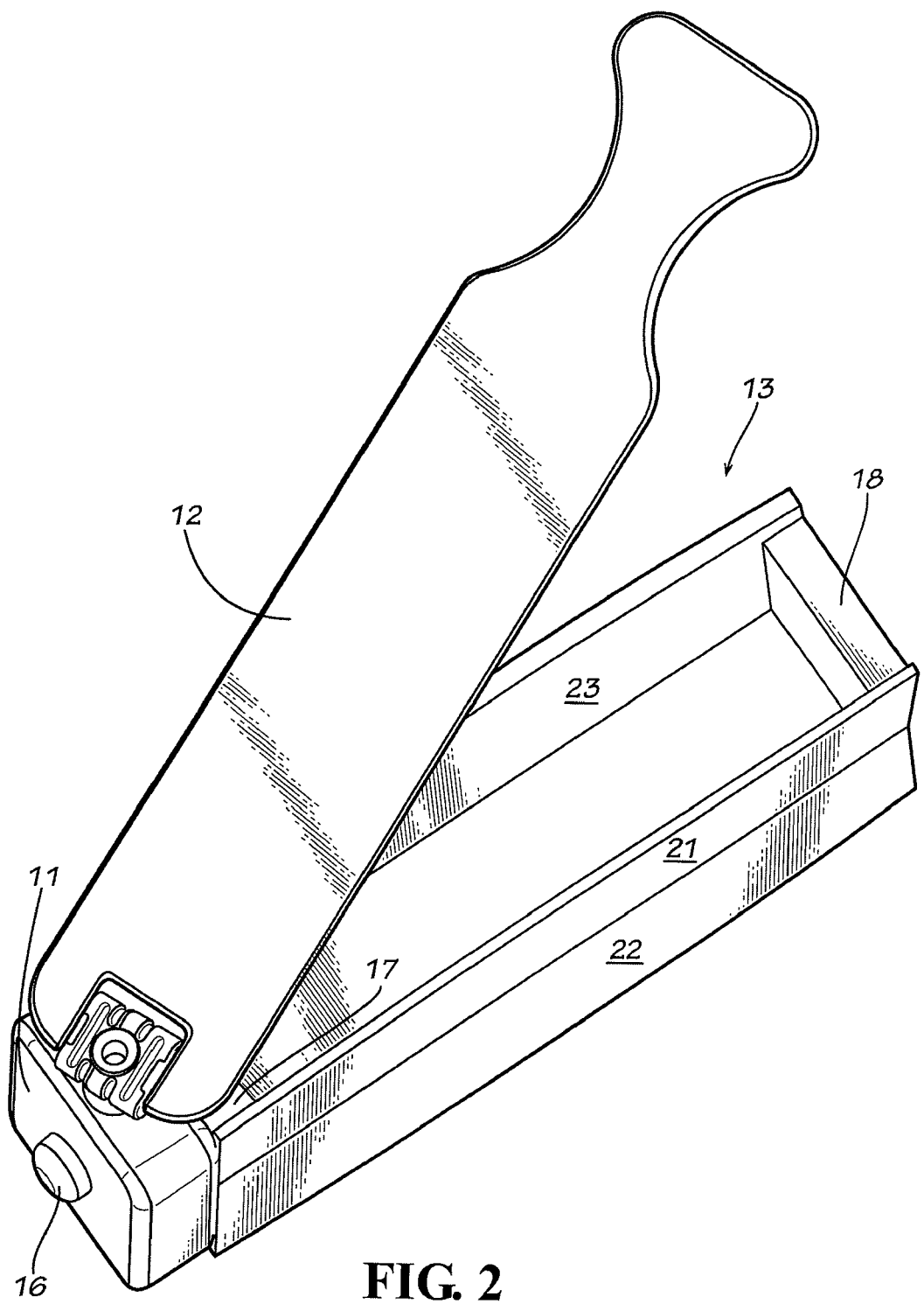
FIG. 2 is a top perspective view of the first embodiment of the apparatus.
Figure 3:
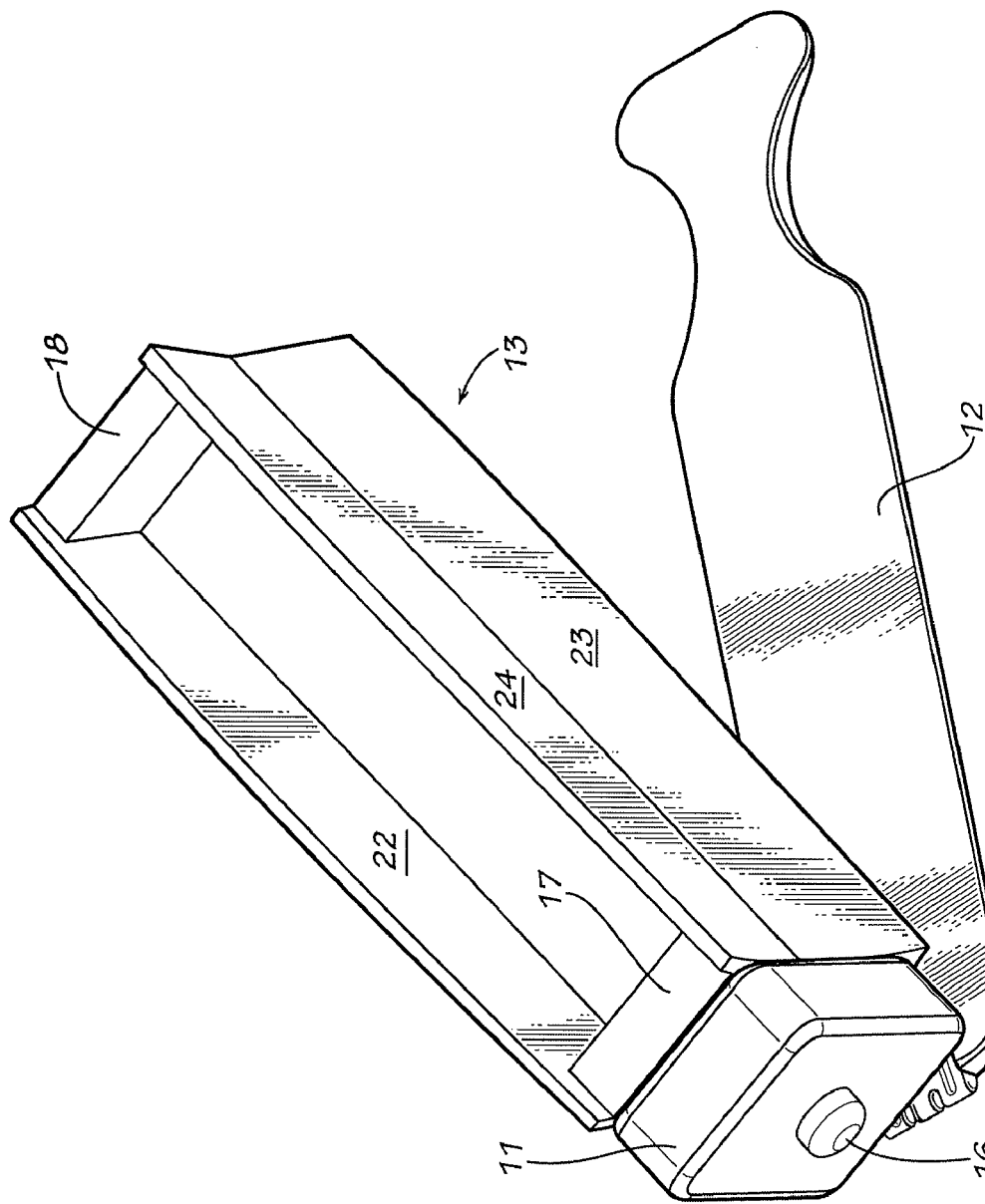
FIG. 3 is a bottom perspective view of the first embodiment of the apparatus.
Figure 4:
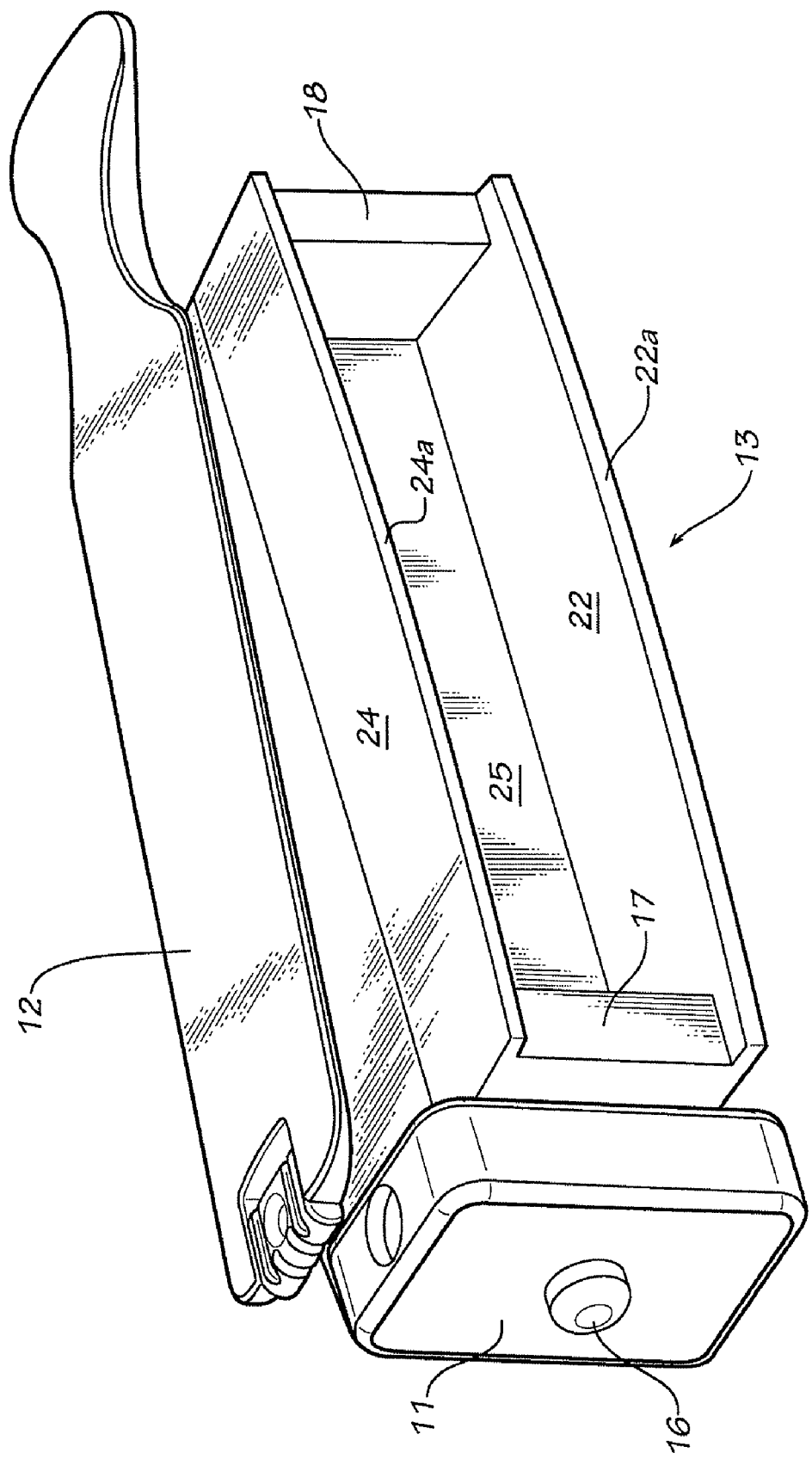
FIG. 4 is a side perspective view of the first embodiment with the sounding plates in a neutral position.

Referring to the FIGS. 1-8 for a clearer understanding of the invention, it may be seen that the preferred embodiments of the invention contemplate a plurality of rotor mounted acoustical plates which can be selectively positioned for engagement by a complimentary striking plate to produce individually distinct sounds or tones. As seen in FIGS. 1 to 4, a base 11 is utilized to mount a rotor 12 and a striker plate 13 in cooperative relation to one another. Rotor 13 includes shaft 16 which extends through base 11 and is rotably captured therein, and end walls 17 and 18 mounted to shaft 16 for rotation therewith. Suspended between end walls 17 and 18 are a plurality of longitudinal plates 21 to 24 and a median plate 25 which connects end walls 17 and 18. Median plate 25 is also affixed to the inner edges of longitudinal plates 21 to 24 thereby forming opposing outwardly opening boxes. The free edges 21a to 24a of longitudinal plates 21 to 24 extend beyond end walls 17 and 18 and are preferentially curved outwardly towards their midpoints. Longitudinal plates 21 to 24, while necessarily similar to each other, are also dissimilar to each other in tonal quality. The difference in tonal quality may be accomplished in one or more ways within the same call including, varying the type material used in each longitudinal plate, varying the thickness of each longitudinal plate, removing portions of the mass of each longitudinal plate, coating the surface of each longitudinal plate with a different material, varying the density of each longitudinal plate, varying the cord length of each longitudinal plate, or any other physical variation that will change the harmonic qualities of each longitudinal plate.

Figure 5:
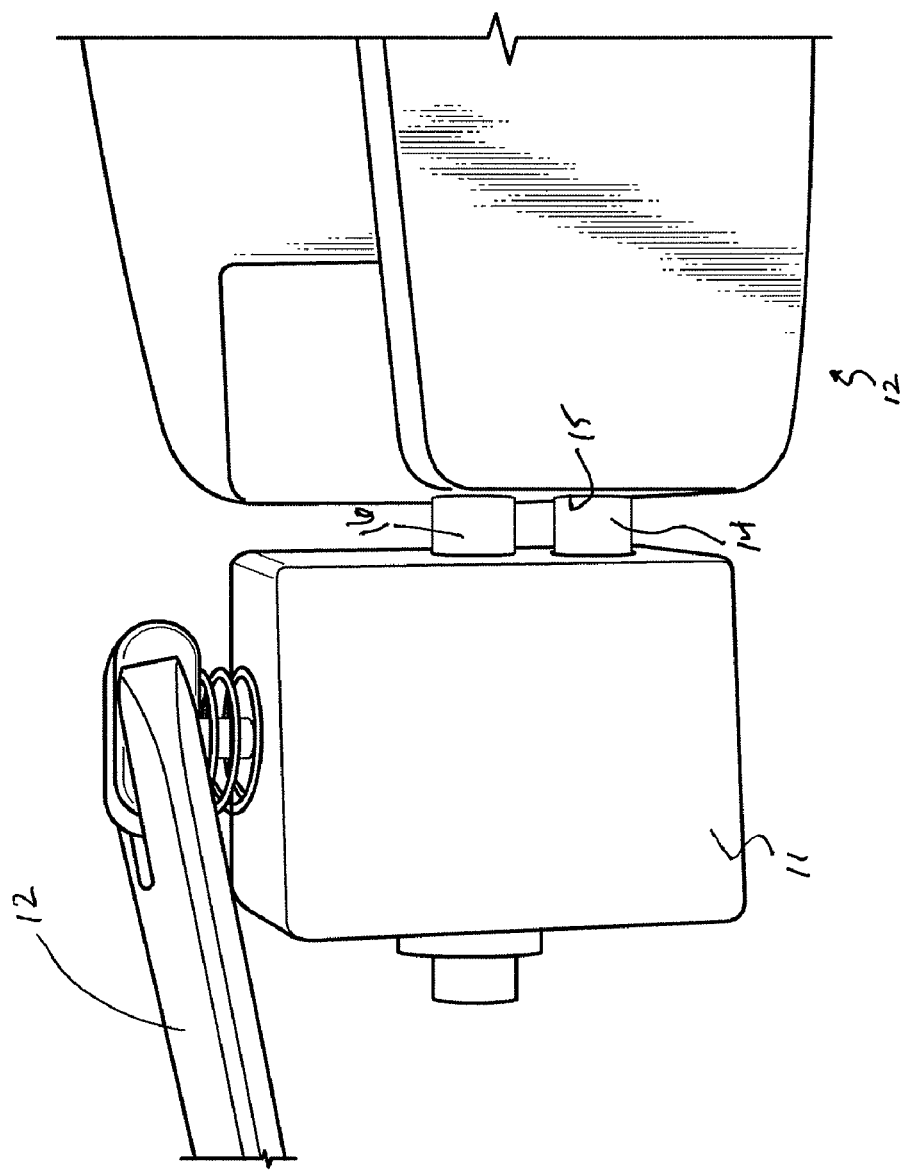
FIG. 5 is a fragmentary perspective view of the first embodiment showing the stop mechanism.

As seen in FIG. 5, base 11 carries at least one stop in the form of protrusion 14 mounted thereon on a surface facing end wall 17. End wall 17 has formed therein a plurality of discreet recesses 15 sized to receive protrusion 14. Recesses 15 are spaced circumferentially around shaft 16 such that axial movement and rotation of the rotor 13 relative to base 11 will allow protrusion 14 to be selectively inserted into one of the plurality of recesses to releasably lock the rotor and base in a fixed position. A spring 26 may be used to bias base 11 relative to rotor 13 such that axial force along the direction of the rotor is required to disengage protrusion 13 from recess 14, however, with some designs the spring may not be necessary.

With reference to FIGS. 1 to 5, it will be seen that striker plate 12 is pivotally mounted at one end to base 11 about a pin 19 and also pivotally mounted for movement about an axis orthogonal to pin 19. Spring 20 provides a resilient bias to the mounted end of striker plate 12. Striker plate 19 as mounted can be manually pivoted in two dimensions relative to rotor 13, such that striker plate can be selectively brought into engagement with the edge of one of the two longitudinal plates closest to striker plate 12 to produce a yelp or other identifiable game call in a conventional manner. That is to say, moving the striker plate 12 across one of the longitudinal plates 21-24 creates vibration in the contacting surfaces which creates a sound dependant on their tonal qualities and the pressure exerted between them which can imitate a turkey or other animal. By selective rotation of base 11 and rotor 13, and movement of striker plate 12, the user can select the specific tonal qualities desired by selecting the specific longitudinal plate for engagement with striker plate 12.

Figure 6:
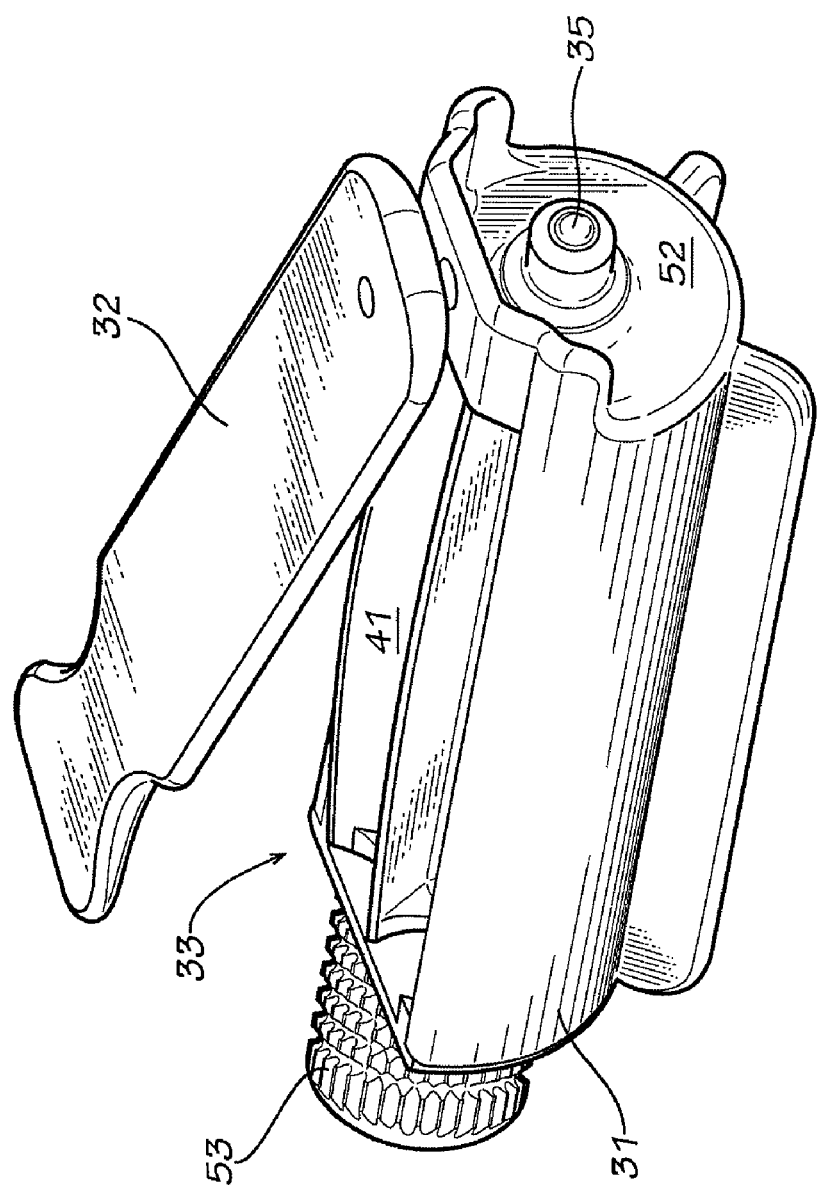
FIG. 6 is a perspective view of a second embodiment.
Figure 7:
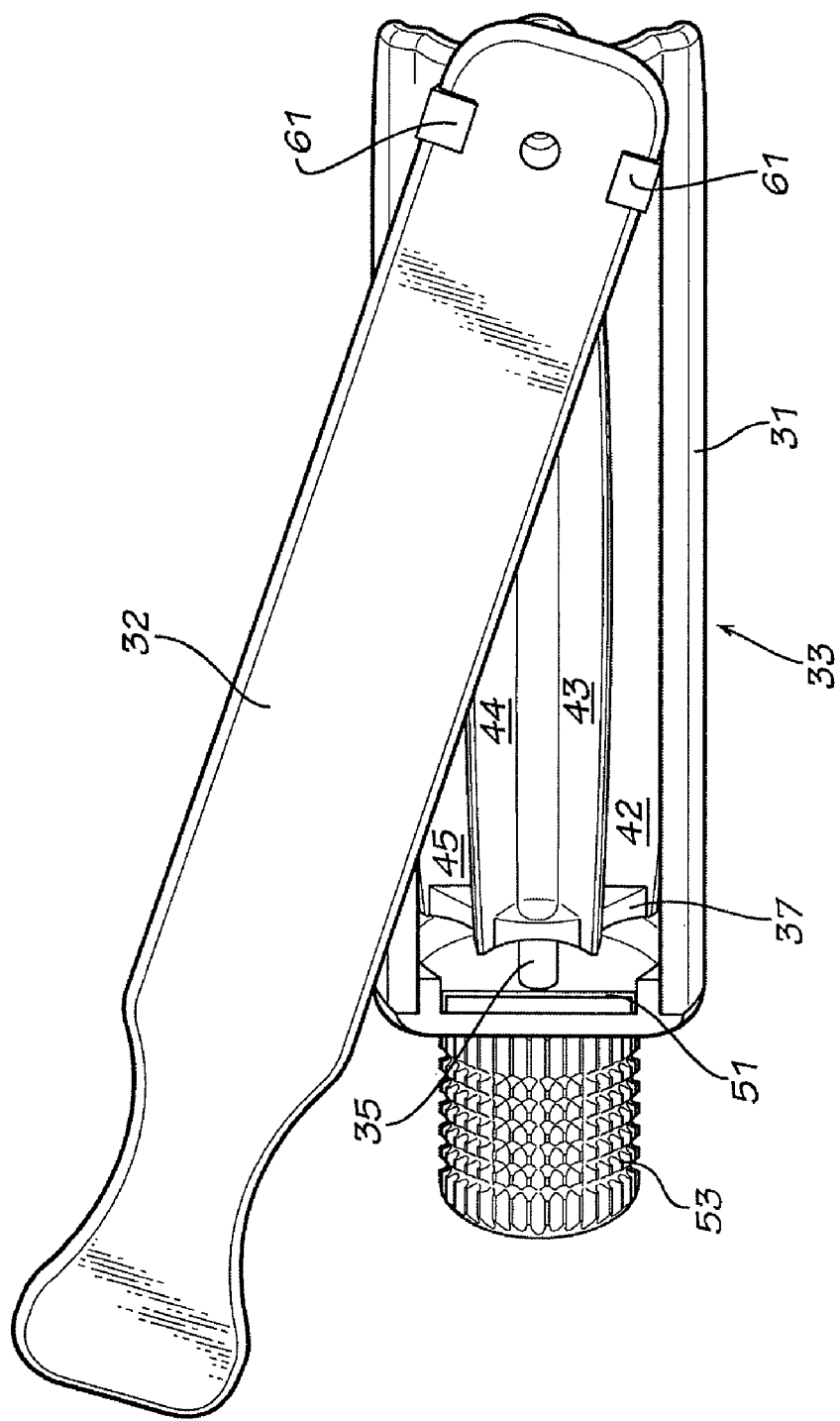
FIG. 7 is a plan view of the second embodiment.
Figure 8:
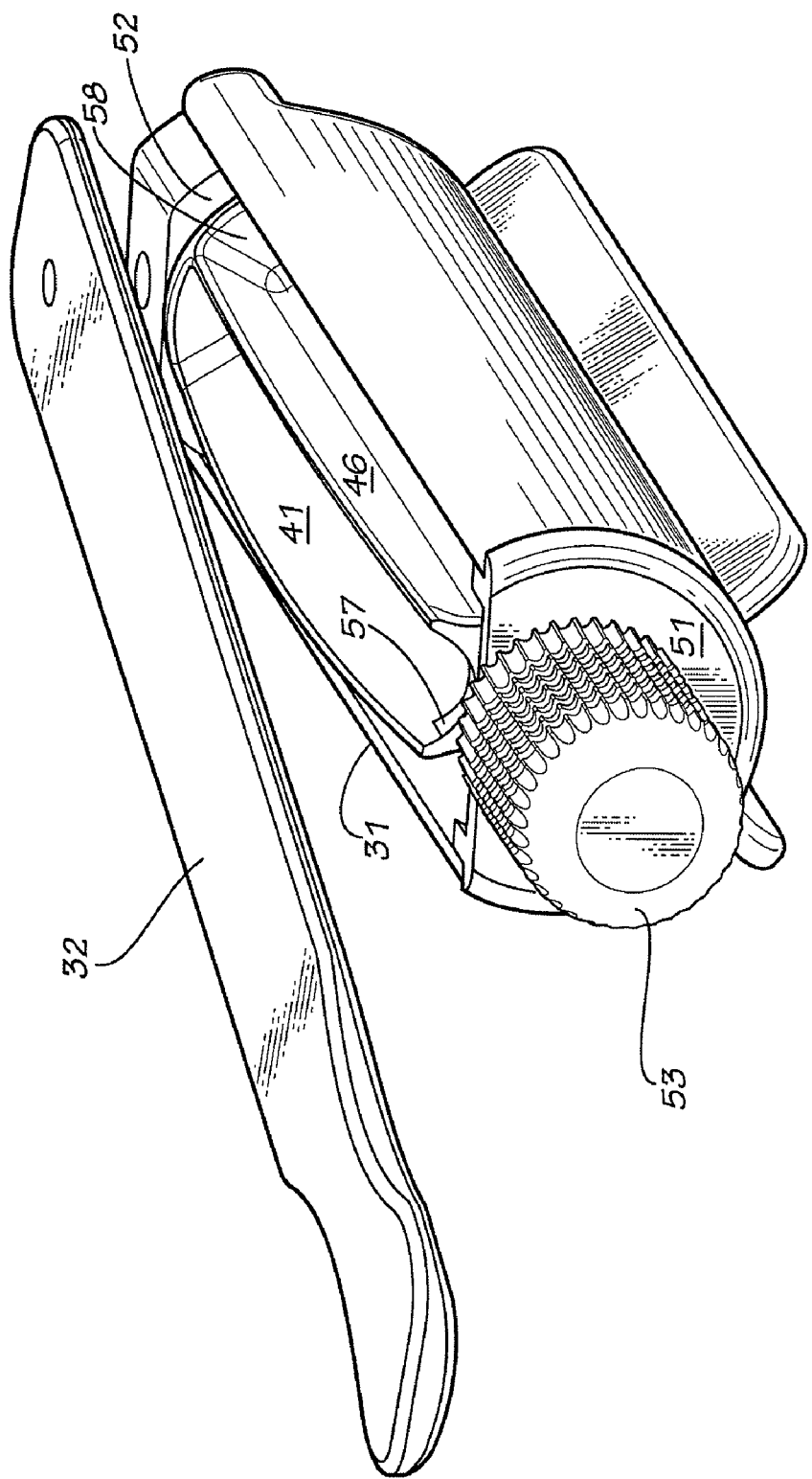
FIG. 8 is a perspective view of the second embodiment from the end opposite that shown in FIG. 6.

Referring to FIGS. 6 to 8, a second embodiment of the invention is shown. The box call of this invention uses a base 31 which may take the form of a housing having a longitudinal opening 31 formed along one side thereof. A striker plate 32 is pivotally mounted to base 31 at one end thereof. A rotor 33 is mounted within base 31 and carries a plurality of angularly spaced, radially extending, longitudinal plates 41 to 46 which are supported by end gussets 37 and 38 affixed to a central shaft 36 which is rotably and slidably received through the ends 51 and 52 of base 31. A knob 53 is affixed to the end of shaft 35 extending through end 51. A stop similar in function to stop 14 is formed between rotor 33 and housing 31 or between knob 53 and housing 31 to selectively hold rotor 33 in position such that one or more longitudinal plates 41 to 46 are exposed within opening 31. As with plates 21 to 24 the edges 41a to 46a of plates 41 to 46 are curved outwardly toward their mid point for engagement with striker plate 32. Also, as with plates 21 to 24, the each plate has a different tonal quality based on the selected physical characteristics of the plates. While the plates may be made of wood, they may also be made from molded resins. In either case, the plates are intended to provide a different tonal quality from each other so that the user may "tune" the resultant sound to the sound he hears from wildlife in the area. With both embodiments, it should be clear that the user can rotate a different acoustical plate into position for engagement by the striker in a matter of seconds, thus enabling the user to quickly match the call of the game animal to the best of his ability. It is also noteworthy to mention that the rotors and blades may be detachably mounted to the base such that an alternate rotor having acoustical panels with different tonal qualities that the original rotor can be mounted to the base to further vary the range of sounds the user can match.

Striker plate 32 is mounted to base 31 in the same manner as striker plate 12 is mounted to base 11. Note that striker plates 12 and 32 are fixed in length however, they can be slidably received in a pivot yoke 61 as shown in fit 7 such that the effective length of the striker plate can be varied to provide yet another tonal difference from the box call.

It is to be understood that the forms of the apparatus shown are preferred embodiments thereof and that various changes and modifications may be made therein without departing from the spirit of the invention or scope as defined in the following claims.

What is claimed is:

1. A game call comprising:
    a base of a size to be held in one hand;
    a rotor mounted to said base, with a plurality of longitudinal plates extending therefrom for selective movement with said rotor to selectively position said plurality of longitudinal plates;
    a pivotally mounted striker plate secured to said base for selective engagement with at least one of said plurality of longitudinal plates; and,
    a stop for securing said rotor in a selected position with at least one of said plurality of longitudinal plates exposed for engagement with said striker plate.

2. A game call as defined in claim 1 wherein each of said plurality of longitudinal plates creates a different sound when engaged with said striker plate.

3. A game call as defined in claim 2, where in at least one of said plurality of longitudinal plates is made from a synthetic material.

4. A game call as defined in claim 2, where in at least one said plurality of longitudinal plates is made from wood.

5. A game call as defined in claim 1, where in each of said plurality of longitudinal plates has a different density.

6. A game call as defined in claim 1, where in each of said plurality of longitudinal plates has a different thickness.

7. A game call as defined in claim 1 wherein each of said plurality of longitudinal plates has a different tonal quality.

8. A game call as defined in claim 1 wherein said base comprises a housing extending about said rotor with an opening for selectively positioning said plurality of plates for engagement with said striker plate.

* * * * *